United States Patent
Baer et al.

(10) Patent No.: US 11,301,124 B2
(45) Date of Patent: Apr. 12, 2022

(54) USER INTERFACE MODIFICATION USING PREVIEW PANEL

(71) Applicant: Microsoft Technology Licensing, LLC, Redmond, WA (US)

(72) Inventors: Matthias Baer, Seattle, WA (US); Bryan K. Mamaril, Seattle, WA (US); Isaiah Ng, Bellevue, WA (US); Garner B. Thomas, Kenmore, WA (US); Cassandra M. April, Seattle, WA (US); Richard Fang, Bellevue, WA (US); Matthew I. Worley, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 545 days.

(21) Appl. No.: 15/680,908

(22) Filed: Aug. 18, 2017

(65) Prior Publication Data
US 2019/0056858 A1 Feb. 21, 2019

(51) Int. Cl.
*G06F 3/00* (2006.01)
*G06F 3/0486* (2013.01)
*G06F 3/04886* (2022.01)
*G06F 9/451* (2018.01)
*G06F 3/0482* (2013.01)
(Continued)

(52) U.S. Cl.
CPC .......... *G06F 3/0486* (2013.01); *G06F 3/0482* (2013.01); *G06F 3/04886* (2013.01); *G06F 3/1423* (2013.01); *G06F 9/452* (2018.02); *G06F 3/04817* (2013.01); *G06F 3/04883* (2013.01);
(Continued)

(58) Field of Classification Search
CPC ................ G06F 3/0486; G06F 3/1423; G06F 2203/04803; G06F 3/04886; G06F 1/1647; G06F 3/017; G06F 3/0481; G06F 3/04842; G06F 1/1649; G06F 3/0488; G06F 3/0484; G06F 3/048; G06F 2203/04104;
(Continued)

(56) References Cited

U.S. PATENT DOCUMENTS 5,263,134 A 11/1993 Paal et al.
5,455,906 A 10/1995 Usuda
(Continued)

OTHER PUBLICATIONS

Shultz, Greg. "How to Juggle multiple applications using Task View in Windows 10", Aug. 14, 2015, Tech Republic <<https://www.techrepublic.com/article/how-to-juggle-multiple-applications-using-task-view-in-windows-10/>> (Year: 2015).*

(Continued)

*Primary Examiner* — Jennifer E Nichols

(57) ABSTRACT

A system for modifying a user interface described herein can include a processor to detect a plurality of display screens electronically coupled to the system. The processor can also detect a first gesture corresponding to an application window displayed in one of the display screens and generate a preview panel in response to detecting the first gesture, the preview panel to be displayed proximate the application window, wherein the preview panel is to display a real-time image comprising content displayed in each of the display screens. Furthermore, the processor can detect a second gesture to move the application window to a different display screen modify the user interface to display the application window in the different display screen.

21 Claims, 7 Drawing Sheets

US 11,301,124 B2
Page 2

(51) Int. Cl.
*G06F 3/14* (2006.01)
*G06F 3/04817* (2022.01)
*G06F 3/04883* (2022.01)

(52) U.S. Cl.
CPC .. *G06F 3/1454* (2013.01); *G06F 2203/04803* (2013.01); *G09G 2354/00* (2013.01)

(58) Field of Classification Search
CPC .... G06F 3/04883; G06F 9/452; G06F 3/0482; G06F 3/04817; G06F 3/1454; G09G 2354/00
See application file for complete search history.

(56) References Cited

U.S. PATENT DOCUMENTS

| | | | |
|---|---|---|---|
| 5,920,316 A | 7/1999 | Oran et al. | |
| 7,802,195 B2 * | 9/2010 | Saul | H04L 67/08 715/769 |
| 8,054,241 B2 * | 11/2011 | Muklashy | G06F 3/1423 345/1.1 |
| 8,490,002 B2 * | 7/2013 | Fai | G06F 1/1645 715/753 |
| 8,847,995 B2 * | 9/2014 | Kimura | H04M 1/0247 345/660 |
| 8,869,065 B2 | 10/2014 | Mandic et al. | |
| 8,976,140 B2 | 3/2015 | Hirata | |
| 9,460,689 B2 * | 10/2016 | Lee | G06F 3/0486 |
| 9,471,150 B1 | 10/2016 | Addaguduru | |
| 9,606,723 B2 | 3/2017 | Selim | |
| 9,727,205 B2 * | 8/2017 | Freedman | G06F 3/0488 |
| 9,798,448 B2 * | 10/2017 | Duffy | G06F 3/0484 |
| 9,946,373 B2 * | 4/2018 | Graf | G06F 3/041 |
| 10,073,613 B2 | 9/2018 | Liao et al. | |
| 11,113,020 B2 * | 9/2021 | Liu | G06T 11/60 |
| 2003/0222923 A1 | 12/2003 | Li | |
| 2004/0150668 A1 | 8/2004 | Myers et al. | |
| 2006/0132474 A1 | 6/2006 | Lam | |
| 2006/0200780 A1 | 9/2006 | Iwema et al. | |
| 2006/0218499 A1 | 9/2006 | Matthews et al. | |
| 2007/0168873 A1 | 7/2007 | Lentz | |
| 2008/0036743 A1 | 2/2008 | Westerman et al. | |
| 2008/0068290 A1 * | 3/2008 | Muklashy | G06F 3/1423 345/2.1 |
| 2008/0115064 A1 * | 5/2008 | Roach | G06F 3/04897 715/730 |
| 2009/0058842 A1 | 3/2009 | Bull et al. | |
| 2009/0070670 A1 | 3/2009 | Kishi | |
| 2009/0083655 A1 * | 3/2009 | Beharie | G06F 3/0481 715/781 |
| 2009/0199128 A1 * | 8/2009 | Matthews | G06F 3/0484 715/799 |
| 2009/0228831 A1 | 9/2009 | Wendker et al. | |
| 2009/0235177 A1 * | 9/2009 | Saul | G06F 3/1454 715/740 |
| 2009/0259967 A1 | 10/2009 | Davidson et al. | |
| 2009/0300541 A1 * | 12/2009 | Nelson | G06F 3/0481 715/799 |
| 2009/0313125 A1 | 12/2009 | Roh et al. | |
| 2009/0327964 A1 | 12/2009 | Mouilleseaux et al. | |
| 2010/0017744 A1 * | 1/2010 | Kikuchi | G06F 3/1446 715/781 |
| 2010/0083111 A1 | 4/2010 | De Los Reyes | |
| 2010/0083154 A1 * | 4/2010 | Takeshita | G16H 15/00 715/769 |
| 2010/0125806 A1 * | 5/2010 | Igeta | G06F 3/0486 715/770 |
| 2010/0192102 A1 | 7/2010 | Chmielewski et al. | |
| 2010/0214322 A1 | 8/2010 | Lim et al. | |
| 2010/0306702 A1 | 12/2010 | Warner | |
| 2011/0047459 A1 | 2/2011 | Van Der Westhuizen | |
| 2011/0066980 A1 | 3/2011 | Chmielewski et al. | |
| 2011/0148926 A1 | 6/2011 | Koo et al. | |
| 2011/0169749 A1 | 7/2011 | Ganey et al. | |
| 2011/0193939 A1 | 8/2011 | Vassigh et al. | |
| 2011/0197147 A1 * | 8/2011 | Fai | G06F 3/017 715/753 |
| 2011/0202879 A1 | 8/2011 | Stovicek et al. | |
| 2011/0209102 A1 | 8/2011 | Hinckley et al. | |
| 2011/0239157 A1 | 9/2011 | Lin et al. | |
| 2011/0260997 A1 * | 10/2011 | Ozaki | G06F 1/1643 345/173 |
| 2011/0316807 A1 | 12/2011 | Corrion | |
| 2012/0001945 A1 | 1/2012 | Oakley | |
| 2012/0044164 A1 | 2/2012 | Kim et al. | |
| 2012/0050314 A1 | 3/2012 | Wang | |
| 2012/0050332 A1 | 3/2012 | Nikara et al. | |
| 2012/0054671 A1 | 3/2012 | Thompson et al. | |
| 2012/0072867 A1 | 3/2012 | Schlegel | |
| 2012/0139815 A1 | 6/2012 | Aono et al. | |
| 2012/0144347 A1 * | 6/2012 | Jo | G06F 3/04817 715/863 |
| 2012/0223898 A1 | 9/2012 | Watanabe et al. | |
| 2012/0289290 A1 | 11/2012 | Chae et al. | |
| 2012/0306930 A1 | 12/2012 | Decker et al. | |
| 2012/0320158 A1 | 12/2012 | Junuzovic et al. | |
| 2012/0327121 A1 | 12/2012 | Dhawade et al. | |
| 2013/0009903 A1 | 1/2013 | Shiota | |
| 2013/0019173 A1 | 1/2013 | Kotler et al. | |
| 2013/0019182 A1 | 1/2013 | Gil et al. | |
| 2013/0019206 A1 | 1/2013 | Kotler et al. | |
| 2013/0038544 A1 | 2/2013 | Park | |
| 2013/0103446 A1 | 4/2013 | Bragdon et al. | |
| 2013/0162569 A1 | 6/2013 | Sudo | |
| 2013/0176255 A1 | 7/2013 | Kim et al. | |
| 2013/0219340 A1 | 8/2013 | Linge | |
| 2013/0237288 A1 | 9/2013 | Lee | |
| 2013/0257777 A1 | 10/2013 | Benko et al. | |
| 2013/0285933 A1 | 10/2013 | Sim et al. | |
| 2013/0311954 A1 | 11/2013 | Minkkinen | |
| 2013/0321319 A1 | 12/2013 | Kuramatsu | |
| 2013/0321340 A1 * | 12/2013 | Seo | G06F 3/04883 345/174 |
| 2014/0033119 A1 | 1/2014 | Kim et al. | |
| 2014/0055390 A1 | 2/2014 | Lim et al. | |
| 2014/0092140 A1 | 4/2014 | Wadhwa et al. | |
| 2014/0160073 A1 | 6/2014 | Matsuki | |
| 2014/0164991 A1 * | 6/2014 | Kim | G06F 3/0481 715/794 |
| 2014/0168277 A1 | 6/2014 | Ashley et al. | |
| 2014/0181739 A1 | 6/2014 | Yoo | |
| 2014/0189583 A1 | 7/2014 | Yang | |
| 2014/0218315 A1 | 8/2014 | Jeong | |
| 2014/0267078 A1 | 9/2014 | Kukulski et al. | |
| 2014/0289642 A1 | 9/2014 | Prasad | |
| 2014/0325431 A1 * | 10/2014 | Vranjes | G06F 9/451 715/788 |
| 2014/0327626 A1 | 11/2014 | Harrison et al. | |
| 2014/0351761 A1 | 11/2014 | Bae et al. | |
| 2014/0365957 A1 * | 12/2014 | Louch | G06F 3/1431 715/790 |
| 2014/0372926 A1 * | 12/2014 | Szeto | G06F 3/0481 715/769 |
| 2015/0046871 A1 * | 2/2015 | Lewis | G06F 9/451 715/798 |
| 2015/0058808 A1 | 2/2015 | John et al. | |
| 2015/0067552 A1 | 3/2015 | Leorin et al. | |
| 2015/0067589 A1 | 3/2015 | Xiao et al. | |
| 2015/0084885 A1 | 3/2015 | Kawamoto | |
| 2015/0186016 A1 | 7/2015 | Li | |
| 2015/0193099 A1 | 7/2015 | Murphy | |
| 2015/0205455 A1 | 7/2015 | Shaw | |
| 2015/0212667 A1 | 7/2015 | Holt et al. | |
| 2015/0256592 A1 * | 9/2015 | Young | H04L 67/125 715/719 |
| 2015/0279037 A1 | 10/2015 | Griffin et al. | |
| 2015/0319202 A1 * | 11/2015 | Chai | G06F 3/0486 715/753 |
| 2015/0331594 A1 | 11/2015 | Terada et al. | |
| 2015/0338998 A1 | 11/2015 | Chathoth et al. | |
| 2015/0378502 A1 | 12/2015 | Hu et al. | |
| 2016/0034157 A1 | 2/2016 | Vranjes et al. | |

(56) References Cited

U.S. PATENT DOCUMENTS

| | | | |
|---|---|---|---|
| 2016/0054881 A1 | 2/2016 | Yoshida et al. | |
| 2016/0077650 A1 | 3/2016 | Durojaiye et al. | |
| 2016/0077685 A1* | 3/2016 | Fang | G06F 9/452 715/778 |
| 2016/0110076 A1* | 4/2016 | Reeves | G06F 3/04845 715/761 |
| 2016/0155410 A1 | 6/2016 | Nam | |
| 2016/0162150 A1 | 6/2016 | Patel et al. | |
| 2016/0162240 A1 | 6/2016 | Gu et al. | |
| 2016/0170617 A1 | 6/2016 | Shi et al. | |
| 2016/0179289 A1 | 6/2016 | Takamura et al. | |
| 2016/0270656 A1 | 9/2016 | Samec et al. | |
| 2016/0307344 A1 | 10/2016 | Monnier et al. | |
| 2016/0334975 A1 | 11/2016 | Takeuchi et al. | |
| 2017/0039414 A1 | 2/2017 | Sreenivas | |
| 2017/0060319 A1 | 3/2017 | Seo et al. | |
| 2017/0097141 A1 | 4/2017 | Hyodo et al. | |
| 2017/0097746 A1 | 4/2017 | Doray et al. | |
| 2017/0180678 A1 | 6/2017 | Fish et al. | |
| 2017/0185037 A1 | 6/2017 | Lee et al. | |
| 2017/0192733 A1* | 7/2017 | Huang | G06F 3/1446 |
| 2017/0255320 A1 | 9/2017 | Kumar et al. | |
| 2017/0269771 A1 | 9/2017 | Nam et al. | |
| 2017/0300205 A1 | 10/2017 | Villa et al. | |
| 2017/0329413 A1 | 11/2017 | Kramer et al. | |
| 2018/0196480 A1 | 7/2018 | Murphy | |
| 2018/0203596 A1* | 7/2018 | Dhaliwal | G06F 3/04817 |
| 2018/0203660 A1* | 7/2018 | Hwang | G06F 3/1446 |
| 2018/0329508 A1* | 11/2018 | Klein | G06F 1/1615 |
| 2018/0329580 A1 | 11/2018 | Aurongzeb et al. | |
| 2019/0129596 A1* | 5/2019 | Ligameri | G06F 3/0483 |
| 2019/0339854 A1 | 11/2019 | Wei | |
| 2021/0097901 A1* | 4/2021 | Klein | G09F 9/301 |

OTHER PUBLICATIONS

"Applicant Initiated Interview Summary Issued in U.S. Appl. No. 15/680,849", dated Jul. 12, 2019, 05 Pages.

"International Search Report and Written opinion Issued in PCT Application No. PCT/US18/038380", dated Sep. 28, 2018, 12 Pages.

"International Search Report and Written opinion Issued in PCT Application No. PCT/US18/038383", dated Sep. 28, 2018, 12 Pages.

"International Search Report and Written opinion Issued in PCT Application No. PCT/US18/038393", dated Oct. 10, 2018, 17 Pages.

"International Search Report and Written opinion Issued in PCT Application No. PCT/US18/038394", dated Sep. 25, 2018, 11 Pages.

"Non Final Office Action Issued in U.S. Appl. No. 15/680,849", dated Jan. 10, 2019, 27 Pages.

"Non Final Office Action Issued in U.S. Appl. No. 15/680,884", dated Dec. 10, 2018, 18 Pages.

"Final Office Action Issued In U.S. Appl. No. 15/680,849", dated May 23, 2019, 25 Pages.

"Non Final Office Action Issued in U.S. Appl. No. 15/680,713", dated Nov. 20, 2019, 15 Pages.

"Final Office Action Issued in U.S. Appl. No. 15/680,713", dated Mar. 3, 2020, 16 Pages.

"Non-Final Office Action Issued in U.S. Appl. No. 15/680,713", dated Jun. 18, 2020, 14 Pages.

"Non Final Office Action Issued in U.S. Appl. No. 15/680,849", dated Jul. 9, 2020, 33 Pages.

"Final Office Action Issued in U.S. Appl. No. 15/680,713", dated Dec. 4, 2020, 14 Pages.

"Office Action Issued in European Patent Application No. 18740029.6", dated Dec. 18, 2020, 11 Pages.

"Final Office Action Issued in U.S. Appl. No. 15/680,849", dated Oct. 23, 2020, 35 Pages.

"Notice of Allowance Issued in U.S. Appl. No. 15/680,713", dated Sep. 17, 2021, 9 Pages.

"Summons to Attend Oral Proceedings Issued in European Patent Application No. 18740029.6", dated Jun. 15, 2021, 16 Pages.

"Non Final Office Action Issued in U.S. Appl. No. 15/680,713", dated Mar. 29, 2021, 16 Pages.

* cited by examiner

200

USER INTERFACE MODIFICATION USING PREVIEW PANEL

BACKGROUND

Computer devices can be coupled to any suitable number of display screens. In some examples, large display screens can depict a user interface of the computer device over a large area. Alternatively, multiple smaller display screens can display extensions of a common user interface. In some examples, application windows and operating system task bars can be separated by large distances. Depending on the size of the display screen or number of display screens, moving an application window can force a user to change physical locations.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment described herein includes a system for modifying a user interface includes a processor and a memory to store a plurality of instructions that, in response to an execution by the processor, cause the processor to detect a plurality of display screens electronically coupled to the system. The plurality of instructions can also cause the processor to detect a first gesture corresponding to an application window displayed in one of the display screens and generate a preview panel in response to detecting the first gesture, the preview panel to be displayed proximate the application window, wherein the preview panel is to display a real-time image comprising content displayed in each of the display screens. Additionally, the plurality of instructions can cause the processor to detect a second gesture to move the application window to a different display screen and modify the user interface to display the application window in the different display screen.

In another embodiment, a method for modifying a user interface can include detecting a plurality of display screens electronically coupled to the system and detecting a first gesture corresponding to an application window displayed in one of the display screens. The method can also include generating a preview panel in response to detecting the first gesture, the preview panel to be displayed proximate the application window, wherein the preview panel is to display a real-time image comprising content displayed in each of the display screens. Furthermore, the method can include detecting a second gesture to move the application window to a different display screen and modifying the user interface to display the application window in the different display screen.

In another embodiment, one or more computer-readable storage media for modifying a user interface can include a plurality of instructions that, in response to execution by a processor, cause the processor to detect a plurality of display screens electronically coupled to the system. The plurality of instructions can also cause the processor to detect a first gesture corresponding to an application window displayed in one of the display screens and generate a preview panel in response to detecting the first gesture, the preview panel to be displayed proximate the application window, wherein the preview panel is to display a real-time image comprising content displayed in each of the display screens. Furthermore, the plurality of instructions can cause the processor to detect a second gesture to move the application window to a different display screen and modify the user interface to display the application window in the different display screen.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
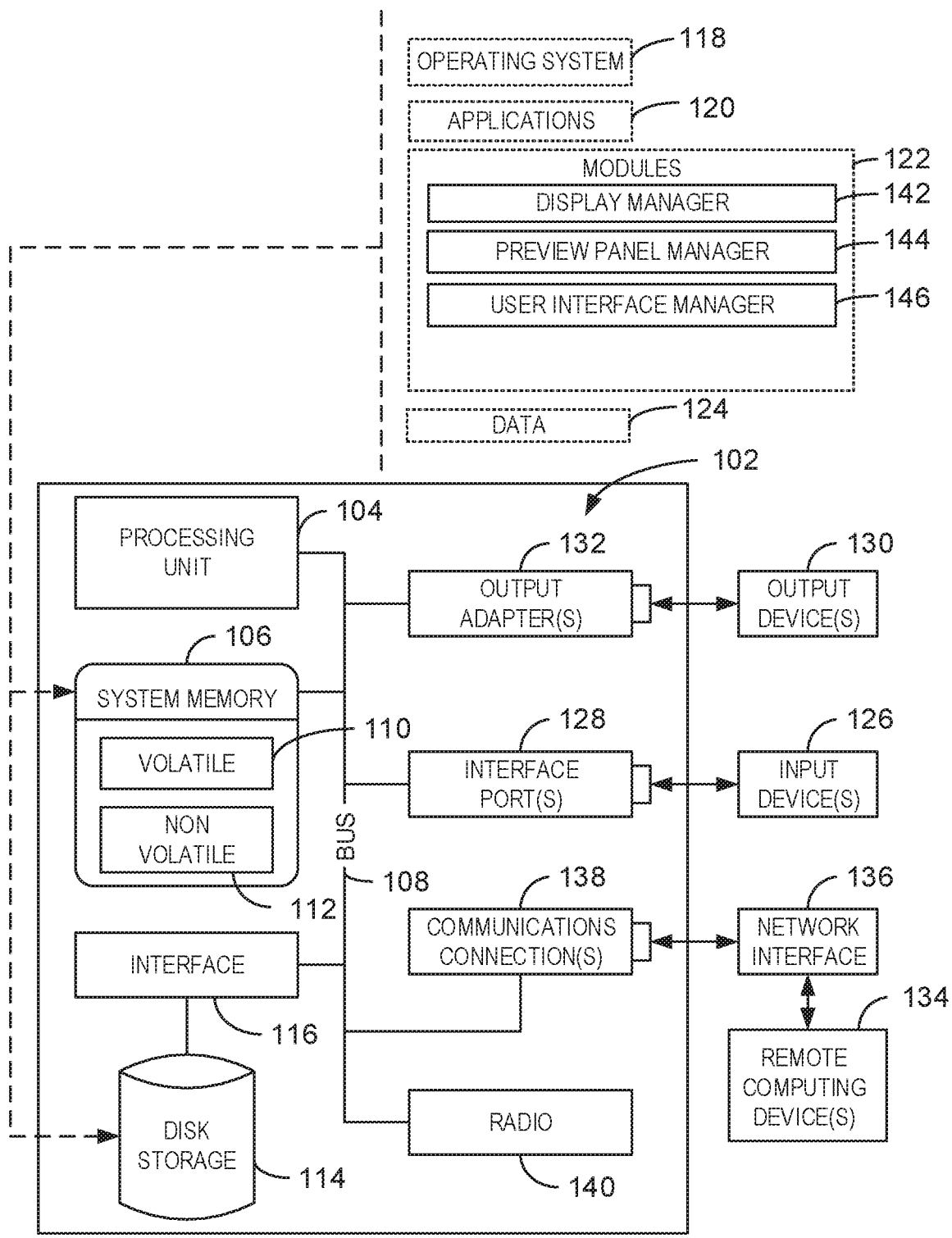
FIG. 1 is a block diagram of an example of a computing system that can modify a user interface.

User interfaces can be generated using various techniques. For example, a user interface can include any suitable number of applications being executed, operating system features, and the like. In some embodiments, a display screen can display large user interfaces that may include application windows spread over large distances. Additionally, multiple display screens can be electronically coupled to one or more systems to provide a representation of a user interface across the multiple display screens. Accordingly, moving an application window from a first display screen to a second display screen or moving an application window within a single display screen can include drag and drop operations that force a user to move to a new physical location.

Techniques described herein provide a system for modifying a user interface. A user interface, as referred to herein, can include any suitable number of application windows, operating system features, or any combination thereof. The application windows can provide a graphical user interface for an actively executed application that is viewable via a display screen. In some embodiments, the system can detect a plurality of display screens electronically coupled to the system. The system can also detect a first gesture corresponding to an application window displayed in one of the display screens. For example, the first gesture can indicate a selection of an application window with a drag and drop gesture, or any other suitable gesture. In some embodiments, the system can also generate a preview panel in response to detecting the first gesture. In some examples, the preview panel can be displayed proximate the application window and the preview panel can display a real-time image comprising content displayed in each of the display screens. For example, the preview panel can be a smaller representation of the real-time image being displayed in the user interface provided to the plurality of display screens. In some examples, the preview panel can include a seam, such as a black region, among others, that indicates an edge of the user interface on each display screen.

In some embodiments, the system can also detect a second gesture to move the application window to a different display screen. For example, the second gesture can indicate that an application window is to be moved across the user interface based on a drag and drop gesture, or any other suitable gesture, detected within the preview panel. In some embodiments, the system can also modify the user interface to display the application window in the different display screen.

The techniques described herein enable modifying a user interface based on a preview panel. For example, the techniques enable moving an application window within a user interface from a first display screen to a second display screen. In some embodiments, the first display screen and second display screen can be connected to a single device or the first display screen and the second display screen can be connected to separate devices. For example, separate paired devices may be electronically coupled to display a single user interface.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality.

The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can modify user interfaces. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

In some embodiments, a unified extensible firmware interface (UEFI) manager or a basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/nonvolatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, such as a display manager 142, a preview panel manager 144, and a user interface manager 146. In some embodiments, the display manager 142 can detect a plurality of display screens electronically coupled to the system. In some embodiments, the preview panel manager 144 can detect a first gesture corresponding to an application window displayed in one of the display screens. The preview panel manager 144 can also generate a preview panel in response to detecting the first gesture. In some examples, the preview panel can be displayed proximate the application window, wherein the preview panel can display a real-time image comprising content displayed in each of the display screens. An example of a preview panel is illustrated below in relation to FIG. 3. Additionally, the preview panel manager 144 can detect a second gesture to move the application window to a different display screen. Furthermore, the user interface manager 146 can modify the user interface to display the application window in the different display screen. Example operations for modifying the user interface with the preview panel are discussed in greater detail below in relation to FIGS. 4A-4I.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the display manager 142, preview panel manager 144, and user interface manager 146 may be partially, or entirely, implemented in hardware and/or in the processing unit (also referred to herein as a processor) 104. For example, the functionality may be implemented with an application specific integrated circuit, in logic implemented in the processing unit 104, or in any other device.

Figure 2:
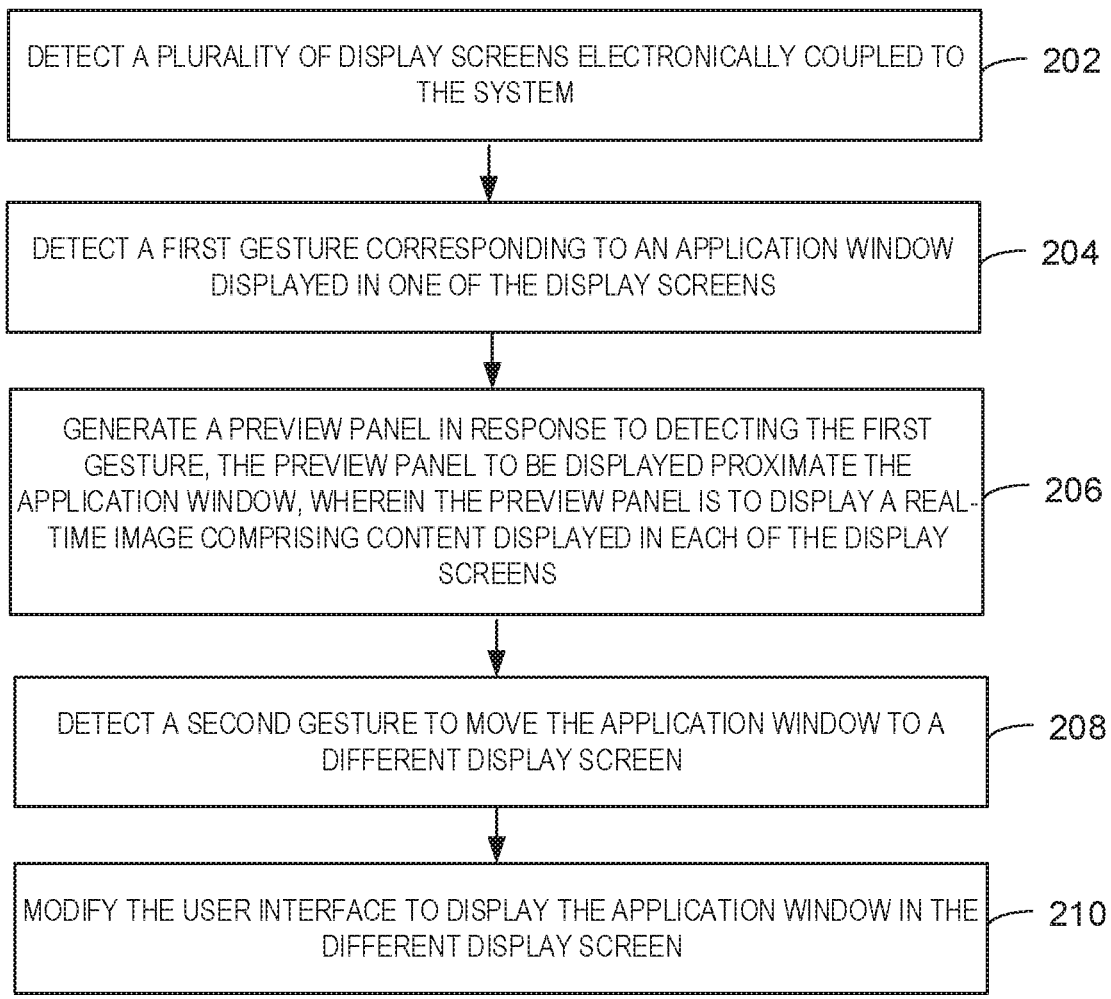
FIG. 2 is a process flow diagram of an example method for modifying user interfaces.

FIG. 2 is a process flow diagram of an example method for modifying a user interface with a preview panel. The method 200 can be implemented with any suitable computing device, such as the computing system 102 of FIG. 1.

At block 202, a display manager 142 can detect a plurality of display screens electronically coupled to the system. In some embodiments, the plurality of display screens can include one or more display screens attached to a single device or one or more display screens attached to multiple devices. For example, a computing device may be electronically coupled to multiple display screens. Alternatively, a tablet computing device, a laptop device, and a mobile device may each be electronically coupled to separate display screens and a combination of the display screens for the tablet computing device, laptop device, and mobile device may be paired to display a user interface. In some embodiments, any two or more computing devices can be paired to display a user interface. For example, display screens for an augmented reality device, a projector device, a desktop computing system, a mobile device, a gaming console, a virtual reality device, or any combination therefore, can be combined to display a user interface. In some embodiments, at least one of the display screens can correspond to a virtual desktop. In some examples, one device can be coupled to a single display screen and a paired device can be coupled to multiple display screens.

At block 204, the preview panel manager 144 can detect a first gesture corresponding to an application window displayed in one of the display screens. In some embodiments, the first gesture can include a touch gesture on one of the display screens coupled to the system. In some examples, the touch gesture can include any number of fingers or any other portion of a hand or hands interacting with a display screen. For example, the touch gesture can include a one finger touch of the display screen, a two finger touch of the display screen, or any additional number of fingers touching the display screen. In some embodiments, the touch gesture can include two hands contacting a display screen within a size and shape of a region of the display screen in which a touch gesture can be detected. In some examples, the area of the region corresponds to any suitable touch of a display screen. For example, a first finger touching the display screen can indicate that additional fingers or hands touching the display screen can be considered part of the touch gesture within a particular distance from the first finger contact. In some embodiments, the touch gesture can also include a temporal component. For example, the touch gesture may include any number of fingers or hands contacting the display screen within a particular region within a particular time frame. In some examples, a delay between touching two fingers to the display screen can result in separate touch gestures being detected.

In some embodiments, the display screen can extrapolate a touch gesture based on a movement proximate a display screen. For example, the gesture detector 142 can use cameras coupled to a system to detect contactless gestures targeting portions of the display screen. The gesture detector 142 can extrapolate or determine the location of the display screen being selected based on the contactless gesture.

In some embodiments, the gesture detector 142 detects the first gesture in areas of an application window. For example, the gesture detector 142 can detect the first gesture applied to an application title bar of an application window or application window features such as a minimize feature, a maximize feature, or a close feature. In some embodiments, the gesture detector 142 registers or detects the first gesture if the first gesture is applied to one of the application window features for a period of time that exceeds a predetermined threshold. For example, the gesture detector 142 can detect a predetermined gesture applied to a minimize feature, a close feature, or a maximize feature for a period of time. In some embodiments, the first gesture corresponds to initiating a drag and drop operation on an application title bar. For example, the drag and drop operation can be initiated with a selection of the application title bar with a mouse, pointer, or any other suitable input device. In some examples, the first gesture can correspond to initiating a drag and drop operation with a representation of an application window provided by an application switcher.

At block 206, the preview panel manager 144 can generate a preview panel in response to detecting the first gesture. In some examples, the preview panel can be displayed proximate the application window, wherein the preview panel is to display a real-time image comprising content displayed in each of the display screens. For example, the preview panel can include a smaller representation of the real-time images being displayed on each of the display screens coupled to a system through one or more devices. In some embodiments, the preview panel can include representations of the actively executed applications displayed on each display screen. The preview panel can facilitate moving an application window from a first display screen to a second display screen. The preview panel can also move content from a first application window on a first display screen to a second application window on a second display screen. Example implementations of the display screen are described in greater detail below in relation to FIGS. 3 and 4. In some embodiments, the gesture detector 142 can hide the preview panel in response to detecting the first gesture moving more than a predetermined distance from the preview panel.

In some embodiments, the method 200 can include generating a preview panel based on a plurality of rules corresponding to a layout of the user interface. The plurality of rules can indicate how to display a preview panel. For example, the preview panel can be generated in relation to other visual elements such as an application launcher, an application switcher, and a window list, among others. An application launcher, as referred to herein, can include a list of executable applications installed on a system, a list of recently accessed applications installed on the system, recommended applications to be installed on the system, and the like. In some examples, the application launcher can include commands that can access programs, documents, and settings. These commands can include a search function based on locally stored applications and files, a list of documents available locally on a device or on a remote server, a control panel to configure components of a device, power function commands to alter the power state of the device, and the like. An application switcher, as referred to herein, can include a link to a digital assistant, a task view illustrating all open applications, a set of icons corresponding to applications being executed, and various icons corresponding to applications and hardware features that are enabled each time a device receives power. In some embodiments, any of the features from the application switcher or application launcher can be included in a preview panel.

In some embodiments, the plurality of rules can indicate an area of a screen that is to be occupied by the preview panel. For example, the location of a preview panel may depend upon whether application windows are overlapping one another, if more than one application window is visible, and the like. For example, the preview panel can be placed above, below, left, right, or diagonal of the first gesture location. In some embodiments, the preview panel can be displayed proximate a first gesture location so that the preview panel is adjacent to a border of the display screen or application window, or centered within an application window.

At block 208, the preview panel manager 144 can detect a second gesture to move the application window to a different display screen. In some embodiments, the second gesture can include releasing a drag and drop gesture, a custom gesture, or any other suitable gesture. The custom gesture, as referred to herein, can enable a user to select multiple display screens and locations within the multiple display screens to display an application window. For example, an application window can be moved with a custom gesture from a first display screen to two or more additional display screens. In some embodiments, the custom gesture can also indicate whether the application window is to be maximized across the two or more additional display screens, displayed at the top of the two or more additional display screens, displayed at the center of the two or more additional display screens, or displayed at the bottom of the two or more additional display screens. In some embodiments, the second gesture can correspond to a seam between multiple display screens, which can indicate that the two display screens adjacent to the seam are to display the application window. In some embodiments, the second gesture can include releasing a drag and drop operation, which can be detected by an input device, such as a mouse or pointer, releasing a button that was selected as the input device moved over a distance of the user interface displayed by a display device.

At block 210, the user interface manager 146 can modify the user interface to display the application window in the different display screen. In some embodiments, the user interface manager 146 can display the application window in any suitable number of different display screens. For example, the user interface manager 146 can modify the user interface to display an application window spread across one or more display screens attached to a system. Modifying the user interface is described in greater detail below in relation to FIGS. 3 and 4A-4I.

In one embodiment, the process flow diagram of FIG. 2 is intended to indicate that the blocks of the method 200 are to be executed in a particular order. Alternatively, in other embodiments, the blocks of the method 200 can be executed in any suitable order and any suitable number of the blocks of the method 200 can be included. Further, any number of additional blocks may be included within the method 200, depending on the specific application. In some embodiments, the method 200 can include generating a copy of the preview panel to be displayed at different locations of the display screen in response to detecting multiple users providing input. For example, each user interacting with a display screen can provide a gesture to a display screen to result in a preview panel being displayed.

In some embodiments, the method 200 can include hiding the preview panel in response to detecting the second gesture moving more than a predetermined distance from the preview panel. In some embodiments, the preview panel comprises actively executed applications being displayed in each of the display screens and the method 200 can include moving or pulling an application window from a remote device to a local system. In some embodiments, the method 200 can include detecting a third gesture or custom gesture within the preview panel enabling user input to determine the display screens and locations within the display screens to display the application window. In some embodiments, the plurality of display screens can include a first display screen from a first device and a second display screen from a second device. In some examples, the first device is a tablet device and the second device is a projector device. In some embodiments, the method 200 can include displaying actively executed applications in each of the display screens and moving content from the application window to a second application window in response to detecting a drag and drop gesture. In some embodiments, the method 200 can include hiding the preview panel in response to detecting a second gesture moving more than a predetermined distance from the preview panel.

Figure 3:
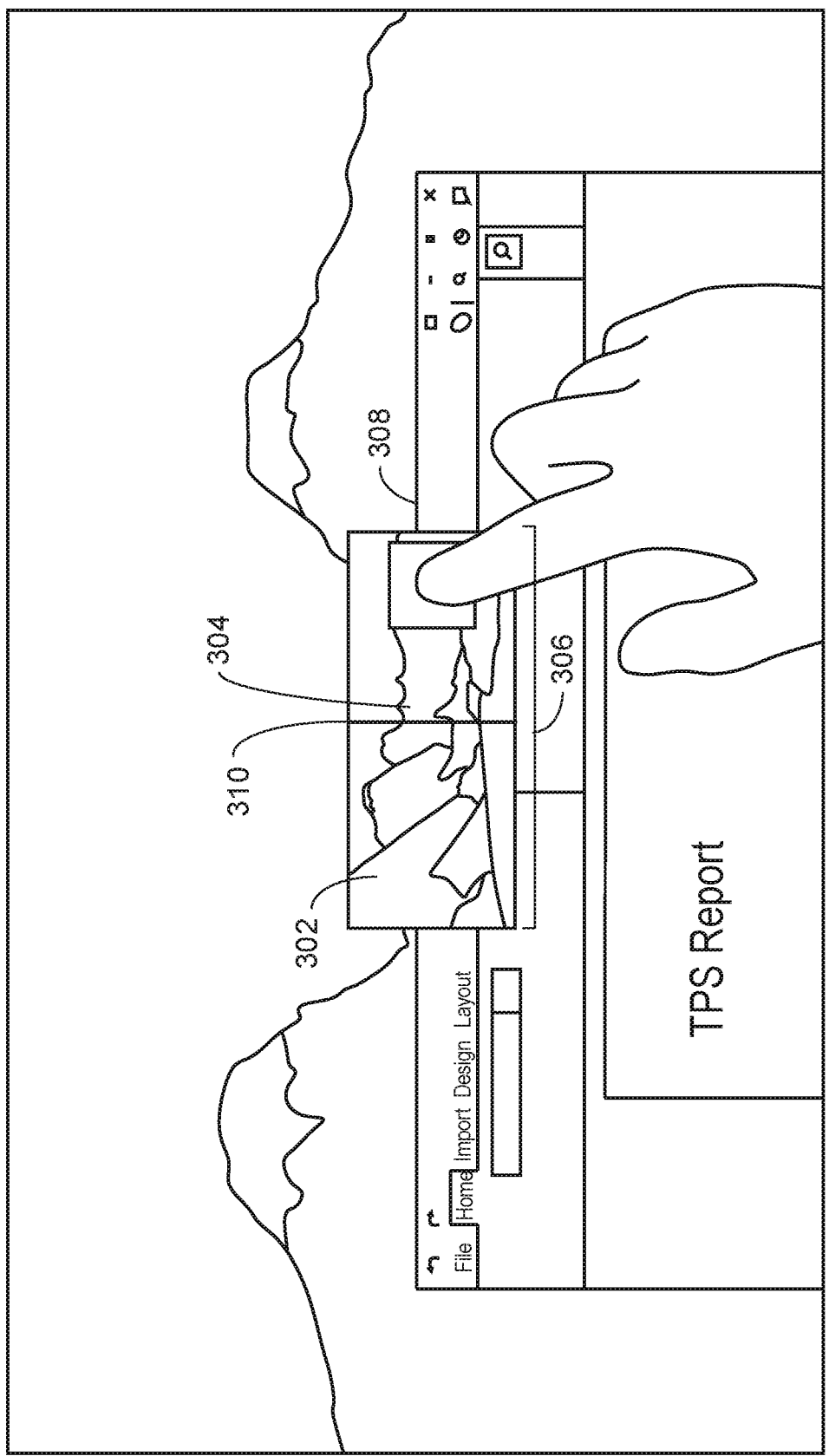
FIG. 3 is an example block diagram illustrating a preview panel used to modify a user interface.

FIG. 3 is an example block diagram illustrating a preview panel used to modify a user interface. In the user interface 300, two display screens represented by individual display screens 302 and 304 of the preview panel 306 display a background image. The application window 308, which corresponds to a word processor application, is selected in the far right individual display screen 304. In some embodiments, any suitable gesture, such as a drag and drop gesture, can move the application window 308 to the additional individual display screen 302. As discussed above, the preview panel 306 can also include seam 310. A gesture terminating on a seam can indicate that a selected application window 308 is to be displayed by two display screens adjacent to a seam. For example, a drag and drop gesture in which the application window is dropped on seam 310 can result in the user interface 300 being modified to display the application window in the individual display screens 302 and 304.

In some embodiments, the preview panel 306 can be generated based on rules. For example, the rules can indicate a location and size of the preview panel based on the location of an application window displayed within a display screen. In some examples, the rules can be written in an Extensible Application Markup Language (XAML), HTML, and the like, to imperatively or declaratively describe the rules which result in the creation of the preview panel.

It is to be understood that the block diagram of FIG. 3 is not intended to indicate that the preview panel 306 contain all of the components shown in FIG. 3. Rather, the preview panel 306 can include fewer or additional components not illustrated in FIG. 3 (e.g., additional application windows, additional individual display screens, etc.).

FIGS. 4A-4I are block diagrams illustrating various preview panel operations used to modify a user interface. In some embodiments, a preview panel can include two or more display screens. A shaded circle indicates a location at which a gesture to move an application window terminates. For example, the shaded circle can correspond to a location in the preview panel at which a drag and drop gesture terminates. In some examples, the termination of a drag and drop gesture or drop location corresponds to a user moving a finger away from a touch screen device so that there is no longer contact. A shaded rectangle of the preview panel can indicate a region of a display screen that is to display the application window following the gesture.

Figure 4A:
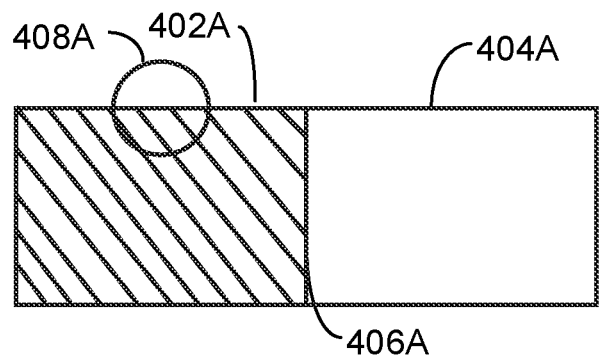
FIGS. 4A-4I are block diagrams illustrating preview panel operations used to modify a user interface.

In FIG. 4A, preview panel 400A includes two display screens 402A and 404A. The preview panel 400A can also include seam 406A. In some examples, terminating a gesture at the top 408A of a display screen depicted in the preview panel, such as 402A, can result in moving an application window to the display screen 402A in a maximized format. The termination point of a gesture 408A is also referred to herein as a drop location.

Figure 4B:
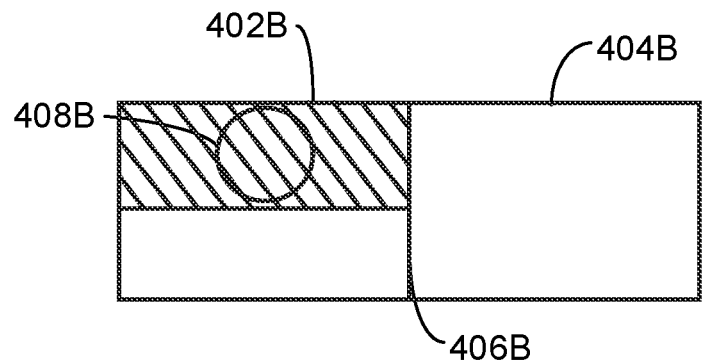

In FIG. 4B, preview panel 400B includes two display screens 402B and 404B. The preview panel 400B can also include seam 406B. In some examples, terminating a gesture in the top region 408B of a display screen depicted in the preview panel, such as 402B, can result in moving an application window to the display screen 402B and displaying the application window in a top region of the display screen 402B.

Figure 4C:
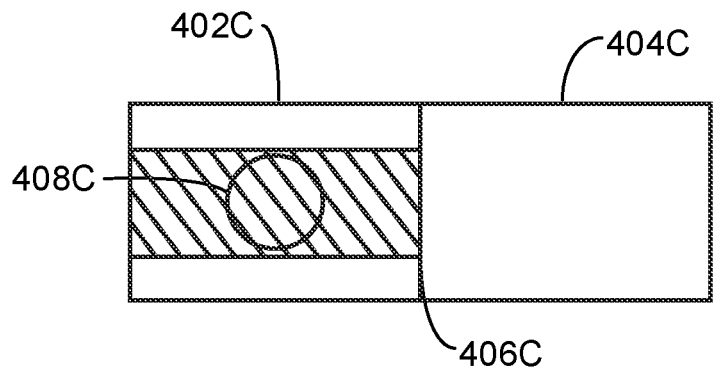

In FIG. 4C, preview panel 400C includes two display screens 402C and 404C. The preview panel 400C can also include seam 406C. In some examples, terminating a gesture in the center region 408C of a display screen depicted in the preview panel, such as 402C, can result in moving an application window to the display screen 402C and displaying the application window in a center region of the display screen 402C.

Figure 4D:
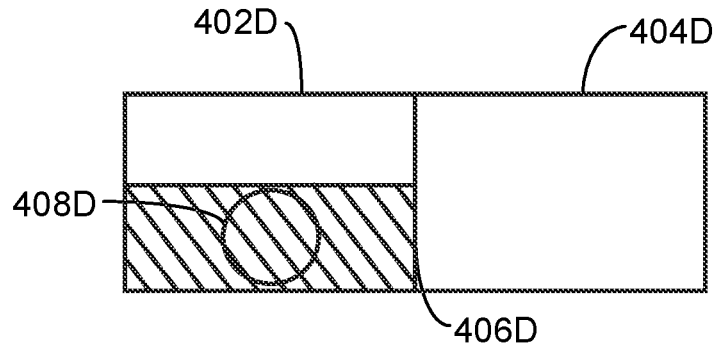

In FIG. 4D, preview panel 400D includes two display screens 402D and 404D. The preview panel 400D can also include seam 406D. In some examples, terminating a gesture in the bottom region 408D of a display screen depicted in the preview panel, such as 402D, can result in moving an application window to the display screen 402D and displaying the application window in a bottom region of the display screen 402D.

Figure 4E:
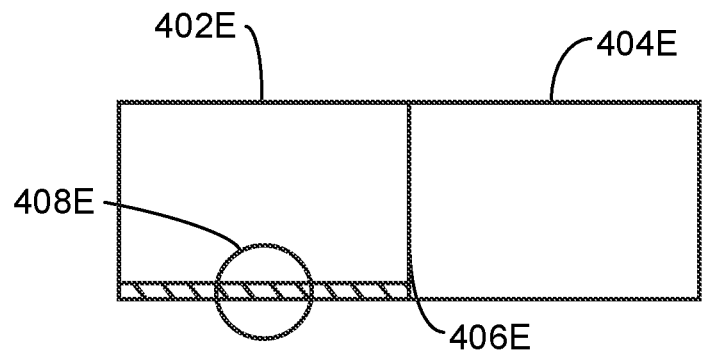

In FIG. 4E, preview panel 400E includes two display screens 402E and 404E. The preview panel 400E can also include seam 406E. In some examples, terminating a gesture at the bottom 408E of a display screen depicted in the preview panel, such as 402E, can result in moving an application window to the display screen 402E and minimizing or hiding the application window.

Figure 4F:
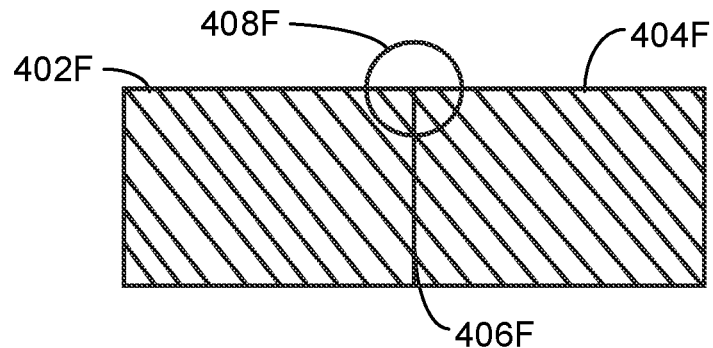

In FIG. 4F, preview panel 400F includes two display screens 402F and 404F. The preview panel 400F can also include seam 406F. In some examples, terminating a gesture at the top 408F of a seam depicted in the preview panel, such as 406F, can result in moving an application window to the display screens 402F and 404F and displaying the application window in a maximized format.

Figure 4G:
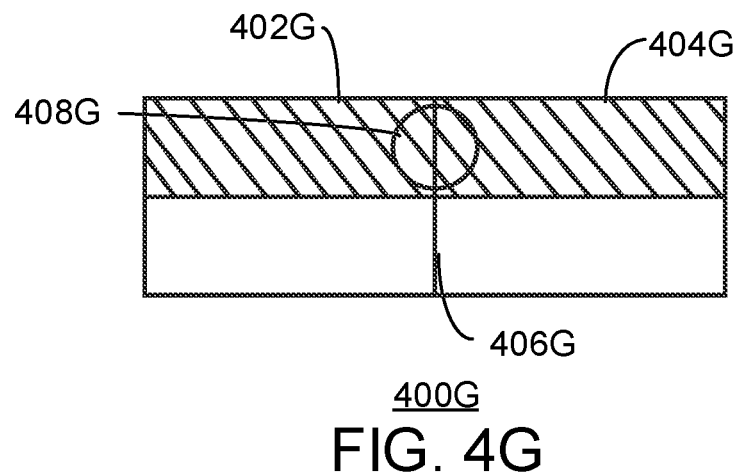

In FIG. 4G, preview panel 400G includes two display screens 402G and 404G. The preview panel 400G can also include seam 406G. In some examples, terminating a gesture in a top region 408G of a seam depicted in the preview panel, such as 406G, can result in moving an application window to the display screens 402G and 404G and displaying the application window in a top region of the display screens 402G and 404G.

Figure 4H:
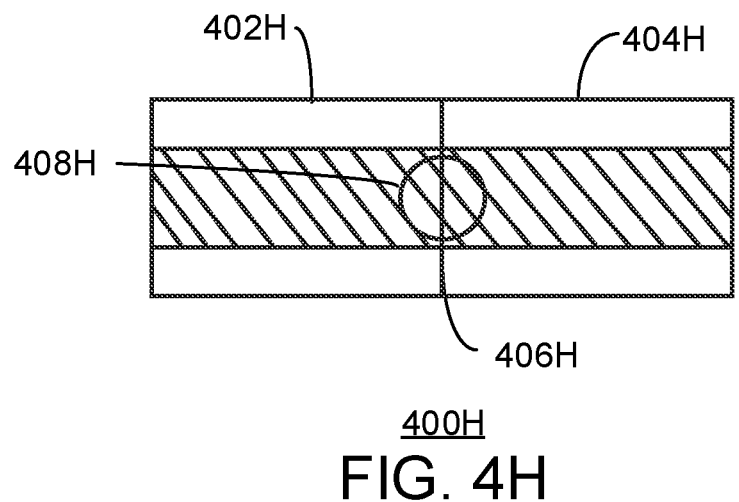

In FIG. 4H, preview panel 400H includes two display screens 402H and 404H. The preview panel 400H can also include seam 406H. In some examples, terminating a gesture in a center region 408H of a seam depicted in the preview panel, such as 406H, can result in moving an application window to the display screens 402H and 404H and displaying the application window in a center region of the display screens 402H and 404H.

Figure 4I:
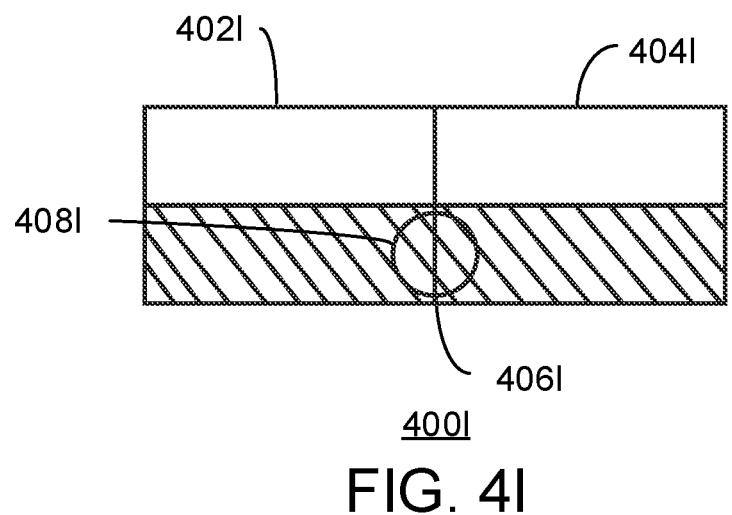

In FIG. 4I, preview panel 400I includes two display screens 402I and 404I. The preview panel 400I can also include seam 406I. In some examples, terminating a gesture in a bottom region 408I of a seam depicted in the preview panel, such as 406I, can result in moving an application window to the display screens 402I and 404I and displaying the application window in a bottom region of the display screens 402I and 404I.

It is to be understood that the block diagrams of FIGS. 4A-4I are not intended to indicate that the preview panels 400A-400I contain all of the components shown in FIGS. 4A-4I. Rather, the preview panels 400A-400I can include fewer or additional components not illustrated in FIGS. 400A-400I (e.g., additional application windows, additional individual display screens, etc.).

Figure 5:
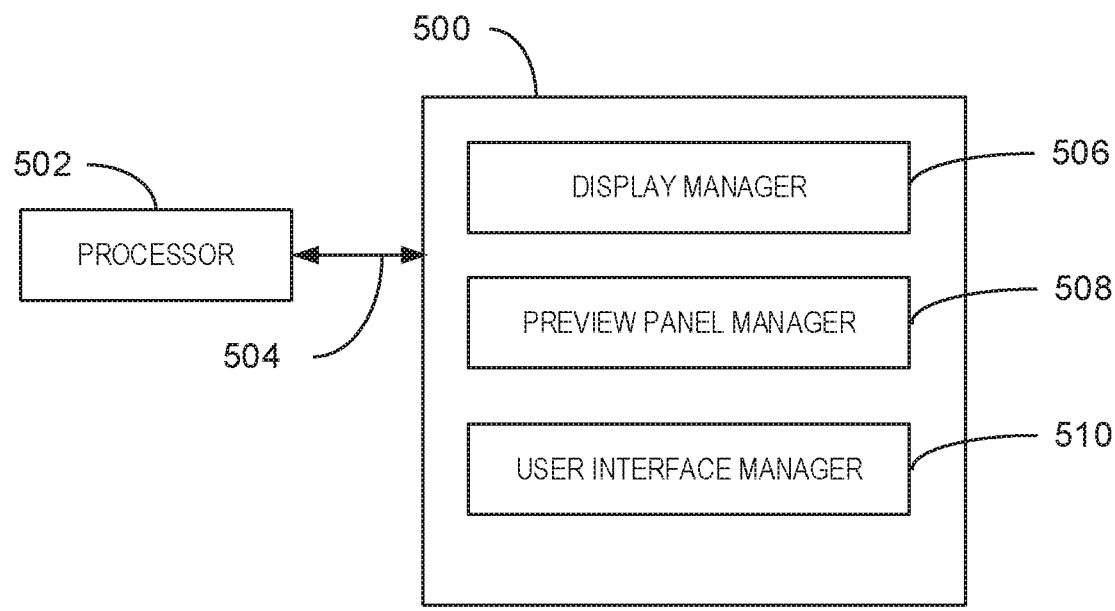
FIG. 5 is a block diagram of an example computer-readable storage media that can modify a user interface.

FIG. 5 is a block diagram of an example computer-readable storage media that can modify a user interface. The tangible, computer-readable storage media 500 may be accessed by a processor 502 over a computer bus 504. Furthermore, the tangible, computer-readable storage media 500 may include code to direct the processor 502 to perform the steps of the current method.

The various software components discussed herein may be stored on the tangible, computer-readable storage media 500, as indicated in FIG. 5. For example, the tangible computer-readable storage media 500 can include a display manager 506 that can detect a plurality of display screens electronically coupled to the system. In some embodiments, a preview panel manager 508 can detect a first gesture corresponding to an application window displayed in one of the display screens. The preview panel manager 508 can also generate a preview panel in response to detecting the first gesture. In some examples, the preview panel can be displayed proximate the application window, wherein the preview panel can display a real-time image comprising content displayed in each of the display screens. Additionally, the preview panel manager 508 can detect a second gesture to move the application window to a different display screen. Furthermore, the user interface manager 510 can modify the user interface to display the application window in the different display screen.

It is to be understood that any number of additional software components not shown in FIG. 5 may be included within the tangible, computer-readable storage media 500, depending on the specific application.

Example 1

In one embodiment, a system for modifying user interfaces includes a processor and a memory to store a plurality of instructions that, in response to an execution by the processor, cause the processor to detect a plurality of display screens electronically coupled to the system. The plurality of instructions can also cause the processor to detect a first gesture corresponding to an application window displayed in one of the display screens and generate a preview panel in response to detecting the first gesture, the preview panel to be displayed proximate the application window, wherein the preview panel is to display a real-time image comprising content displayed in each of the display screens. Additionally, the plurality of instructions can cause the processor to detect a second gesture to move the application window to a different display screen and modify the user interface to display the application window in the different display screen.

Alternatively, or in addition, the plurality of display screens comprise a first display screen from a first device and a second display screen from a second device. Alternatively, or in addition, the first device is a tablet device and the second device is a projector device. Alternatively, or in addition, the plurality of instructions cause the processor to detect a drop of the application window on a seam in the preview panel and display the application window across two display screens adjacent to the seam. Alternatively, or in addition, the plurality of instructions cause the processor to detect a drop location of the application window based on a top location, a center location, or a bottom location of the different display screen of the preview panel and display the application window in the drop location. Alternatively, or in addition, the plurality of instructions cause the processor to detect a drop of the application window in the different display screen of the preview panel and display the application window in a maximized format or a minimized format in the different display screen. Alternatively, or in addition, the plurality of instructions cause the processor to detect a third gesture within the preview panel enabling user input to determine the display screens and locations within the display screens to display the application window. Alternatively, or in addition, the preview panel comprises actively executed applications being displayed in each of the display screens and wherein the processor is to move content from the application window to a second application window in response to detecting a drag and drop gesture. Alternatively, or in addition, the preview panel comprises actively executed applications being displayed in each of the display screens and wherein the processor is to move the application window from a remote device to the system. Alternatively, or in addition, the display screens comprise at least one virtual desktop. Alternatively, or in addition, the first gesture and the second gesture correspond to a drag and drop operation, wherein the first gesture is to be associated with initiating the drag and drop operation on an application title bar and the second gesture is to be associated with a release of the drag and drop operation. Alternatively, or in addition, the first gesture and the second gesture correspond to a drag and drop operation, wherein the first gesture is to be associated with initiating the drag and drop operation with a representation of an application window provided by an application switcher and the second gesture is to be associated with a release of the drag and drop operation. Alternatively, or in addition, the initiation of the drag and drop operation comprises a selection of the application title bar with an input device and the release of the drag and drop operation comprises releasing the selection from the input device in response to detecting a movement of the input device. Alternatively, or in addition, the plurality of instructions cause the processor to hide the preview panel in response to detecting the first gesture moving more than a predetermined distance from the preview panel.

Example 2

In another embodiment, a method for modifying a user interface can include detecting a plurality of display screens electronically coupled to the system and detecting a first gesture corresponding to an application window displayed in one of the display screens. The method can also include generating a preview panel in response to detecting the first gesture, the preview panel to be displayed proximate the application window, wherein the preview panel is to display a real-time image comprising content displayed in each of the display screens. Furthermore, the method can include detecting a second gesture to move the application window to a different display screen and modifying the user interface to display the application window in the different display screen.

Alternatively, or in addition, the plurality of display screens comprise a first display screen from a first device and a second display screen from a second device. Alternatively, or in addition, the first device is a tablet device and the second device is a projector device. Alternatively, or in addition, the method comprises detecting a drop of the application window on a seam in the preview panel and displaying the application window across two display screens adjacent to the seam. Alternatively, or in addition, the method comprises detecting a drop location of the application window based on a top location, a center location, or a bottom location of the different display screen of the preview panel and displaying the application window in the drop location. Alternatively, or in addition, the method comprises detecting a drop of the application window in the different display screen of the preview panel and displaying the application window in a maximized format or a minimized format in the different display screen. Alternatively, or in addition, the method comprises detecting a third gesture within the preview panel enabling user input to determine the display screens and locations within the display screens to display the application window. Alternatively, or in addition, the preview panel comprises actively executed applications being displayed in each of the display screens and wherein the method comprises moving content from the application window to a second application window in response to detecting a drag and drop gesture. Alternatively, or in addition, the preview panel comprises actively executed applications being displayed in each of the display screens and wherein the method comprises moving the application window from a remote device to the system. Alternatively, or in addition, the display screens comprise at least one virtual desktop. Alternatively, or in addition, the first gesture and the second gesture correspond to a drag and drop operation, wherein the first gesture is to be associated with initiating the drag and drop operation on an application title bar and the second gesture is to be associated with a release of the drag and drop operation. Alternatively, or in addition, the first gesture and the second gesture correspond to a drag and drop operation, wherein the first gesture is to be associated with initiating the drag and drop operation with a representation of an application window provided by an application switcher and the second gesture is to be associated with a release of the drag and drop operation. Alternatively, or in addition, the initiation of the drag and drop operation comprises a selection of the application title bar with an input device and the release of the drag and drop operation comprises releasing the selection from the input device in response to detecting a movement of the input device. Alternatively, or in addition, the method comprises hiding the preview panel in response to detecting the first gesture moving more than a predetermined distance from the preview panel.

Example 3

In another embodiment, one or more computer-readable storage media for modifying a user interface include a plurality of instructions that, in response to execution by a processor, cause the processor to detect a plurality of display screens electronically coupled to the system. The plurality of instructions can also cause the processor to detect a first gesture corresponding to an application window displayed in one of the display screens and generate a preview panel in response to detecting the first gesture, the preview panel to be displayed proximate the application window, wherein the preview panel is to display a real-time image comprising content displayed in each of the display screens. Furthermore, the plurality of instructions can cause the processor to detect a second gesture to move the application window to a different display screen and modify the user interface to display the application window in the different display screen.

Alternatively, or in addition, the plurality of display screens comprise a first display screen from a first device and a second display screen from a second device. Alternatively, or in addition, the first device is a tablet device and the second device is a projector device. Alternatively, or in addition, the plurality of instructions cause the processor to detect a drop of the application window on a seam in the preview panel and display the application window across two display screens adjacent to the seam. Alternatively, or in addition, the plurality of instructions cause the processor to detect a drop location of the application window based on a top location, a center location, or a bottom location of the different display screen of the preview panel and display the application window in the drop location. Alternatively, or in addition, the plurality of instructions cause the processor to detect a drop of the application window in the different display screen of the preview panel and display the application window in a maximized format or a minimized format in the different display screen. Alternatively, or in addition, the plurality of instructions cause the processor to detect a third gesture within the preview panel enabling user input to determine the display screens and locations within the display screens to display the application window. Alternatively, or in addition, the preview panel comprises actively executed applications being displayed in each of the display screens and wherein the processor is to move content from the application window to a second application window in response to detecting a drag and drop gesture. Alternatively, or in addition, the preview panel comprises actively executed applications being displayed in each of the display screens and wherein the processor is to move the application window from a remote device to the system. Alternatively, or in addition, the display screens comprise at least one virtual desktop. Alternatively, or in addition, the first gesture and the second gesture correspond to a drag and drop operation, wherein the first gesture is to be associated with initiating the drag and drop operation on an application title bar and the second gesture is to be associated with a release of the drag and drop operation. Alternatively, or in addition, the first gesture and the second gesture correspond to a drag and drop operation, wherein the first gesture is to be associated with initiating the drag and drop operation with a representation of an application window provided by an application switcher and the second gesture is to be associated with a release of the drag and drop operation. Alternatively, or in addition, the initiation of the drag and drop operation comprises a selection of the application title bar with an input device and the release of the drag and drop operation comprises releasing the selection from the input device in response to detecting a movement of the input device. Alternatively, or in addition, the plurality of instructions cause the processor to hide the preview panel in response to detecting the first gesture moving more than a predetermined distance from the preview panel.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system for modifying a user interface comprising:
 a processor; and
 a memory to store a plurality of instructions that, in response to an execution by the processor, cause the processor to:
 electronically couple two or more computing devices to display a user interface;
 detect a plurality of display screens electronically coupled to the two or more coupled computing devices, wherein the user interface is configured to display content from the two or more coupled computing devices as a single user interface across the plurality of display screens;
 detect a first gesture comprising an initiation of a drag and drop operation on an application title bar of an actively executing application window displayed on one of the plurality of display screens;
 in response to detecting the first gesture, generate a preview panel displayed proximate to the application window, wherein the preview panel is configured to display a real-time image comprising the content from the two or more coupled computing devices, and wherein the preview panel includes individual display screens representing a respective display screen of each of the plurality of display screens of the two or more coupled computing devices and includes a seam comprising a region indicating an edge between two of the plurality of display screens;
 detect a second gesture within the preview panel comprising a release of the drag and drop operation of the application window, wherein the second gesture terminates on the seam within the preview panel; and
 in response to detecting the second gesture, modify the user interface to display the application window across the two of the plurality of display screens adjacent to the seam.

2. The system of claim 1, wherein the plurality of display screens comprise a first display screen from a first device and a second display screen from a second device.

3. The system of claim 2, wherein the first device is a tablet device and the second device is a projector device.

4. The system of claim 1, wherein the plurality of instructions further cause the processor to detect a drop location of the application window based on a top location, a center location, or a bottom location of a different display screen of the preview panel and display the application window in the drop location.

5. The system of claim 1, wherein the plurality of instructions further cause the processor to detect the drop of the application window in a different display screen of the preview panel and display the application window in a maximized format or a minimized format in the different display screen.

6. The system of claim 1, wherein the plurality of instructions further cause the processor to detect a third gesture within the preview panel enabling user input to determine the plurality of display screens and locations within the plurality of display screens to display the application window.

7. The system of claim 1, wherein the preview panel comprises actively executed applications being displayed in each of the plurality of display screens and wherein the processor is to move content from the application window to a second application window in response to detecting the drag and drop operation.

8. The system of claim 1, wherein the preview panel comprises actively executed applications being displayed in each of the plurality of display screens and wherein the processor is to move the application window from a remote device to the system.

9. The system of claim 1, wherein the plurality of display screens comprise at least one virtual desktop.

10. The system of claim 1, wherein the first gesture is further associated with initiating the drag and drop operation with a representation of the application window provided by an application switcher.

11. The system of claim 1, wherein the initiating of the drag and drop operation comprises a selection of the application title bar with an input device and the release of the drag and drop operation comprises releasing the selection from the input device in response to detecting a movement of the input device.

12. The system of claim 1, wherein the plurality of instructions further cause the processor to hide the preview panel in response to detecting the first gesture moving more than a predetermined distance from the preview panel.

13. A method for modifying a user interface comprising:
 electronically coupling two or more computing devices to display a user interface;
 detecting a plurality of display screens electronically coupled to the two or more coupled computing devices, wherein the user interface is configured to display content from the two or more coupled computing devices as a single user interface across the plurality of display screens;
 detecting a first gesture comprising an initiation of a drag and drop operation on an application title bar of an actively executing application window displayed on one of the plurality of display screens;
 in response to detecting the first gesture, generating a preview panel displayed proximate to the application window, wherein the preview panel is configured to display a real-time image comprising the content from the two or more coupled computing devices, and wherein the preview panel includes individual display screens representing a respective display screen of each of the plurality of display screens of the two or more coupled computing devices and includes a seam comprising a region indicating an edge between two of the plurality of display screens;
 detecting a second gesture within the preview panel comprising a release of the drag and drop operation of the application window, wherein the second gesture terminates on the seam within the preview panel; and
 in response to detecting the second gesture, modifying the user interface to display the application window across the two of the plurality of display screens adjacent to the seam.

14. The method of claim 13, wherein the plurality of display screens comprise a first display screen from a first device and a second display screen from a second device.

15. The method of claim 14, wherein the first device is a tablet device and the second device is a projector device.

16. The method of claim 13, further comprising detecting a drop location of the application window based on a top location, center location, or bottom location of a different display screen of the preview panel and displaying the application window in the drop location.

17. The method of claim 13, wherein the first gesture is further associated with initiating the drag and drop operation with a representation of the application window provided by an application switcher.

18. The method of claim 13, wherein the initiating of the drag and drop operation comprises a selection of the application title bar with an input device and the release of the drag and drop operation comprises releasing the selection from the input device in response to detecting a movement of the input device.

19. The method of claim 13, comprising hiding the preview panel in response to detecting the first gesture moving more than a predetermined distance from the preview panel.

20. The system of claim 1, wherein the plurality of display screens comprises at least three screens.

21. The system of claim 1, wherein the second gesture terminates at a top region of the seam between the two display screens within the preview panel.

* * * * *